(12) United States Patent
Massura et al.

(10) Patent No.: US 12,371,391 B2
(45) Date of Patent: Jul. 29, 2025

(54) SOIL COMPOSITION INCLUDING BIOCHAR, COMPOST, AND BARK FINES

(71) Applicant: Rosy Soil PBC, New York, NY (US)

(72) Inventors: Chad Massura, New York, NY (US); Justin Giuliano, New York, NY (US)

(73) Assignee: Rosy Soil PBC, NY (US)

( * ) Notice: Subject to any disclaimer, the term of this patent is extended or adjusted under 35 U.S.C. 154(b) by 0 days.

(21) Appl. No.: 18/907,328

(22) Filed: Oct. 4, 2024

(65) Prior Publication Data

US 2025/0115525 A1 Apr. 10, 2025

Related U.S. Application Data

(60) Provisional application No. 63/575,681, filed on Apr. 6, 2024, provisional application No. 63/587,985, filed on Oct. 4, 2023.

(51) Int. Cl.
| | | |
|---|---|---|
| *C05D 9/02* | (2006.01) | |
| *C05F 5/00* | (2006.01) | |
| *C05F 17/05* | (2020.01) | |
| *C09K 17/16* | (2006.01) | |

(52) U.S. Cl.
CPC ............... *C05D 9/02* (2013.01); *C05F 5/002* (2013.01); *C05F 17/05* (2020.01); *C09K 17/16* (2013.01)

(58) Field of Classification Search
CPC . C05D 9/02; C05F 17/05; C05F 5/002; C09K 17/16
See application file for complete search history.

(56) References Cited

U.S. PATENT DOCUMENTS

| | | | | |
|---|---|---|---|---|
| 8,317,891 | B1 * | 11/2012 | Cheiky | C10B 57/02 |
| | | | | 71/31 |
| 2011/0023566 | A1 * | 2/2011 | Lodwig | C05B 17/02 |
| | | | | 71/14 |
| 2013/0232869 | A1 | 9/2013 | Yu et al. | |
| 2015/0128672 | A1 * | 5/2015 | Shearer | C05G 3/00 |
| | | | | 71/24 |
| 2021/0276928 | A1 * | 9/2021 | Cullinan | C05F 17/05 |
| 2022/0174985 | A1 * | 6/2022 | Kim | A23K 40/10 |
| 2024/0246875 | A1 * | 7/2024 | Ciuperca | C05D 9/02 |

FOREIGN PATENT DOCUMENTS

| | | | |
|---|---|---|---|
| BR | 102020017712 A2 | 3/2022 | |
| CN | 103435411 A | 12/2013 | |
| CN | 105854417 A * | 8/2016 | ............ B01D 39/14 |
| CN | 106083310 A | 11/2016 | |

(Continued)

OTHER PUBLICATIONS

Vandercasteele B., Similon, L., Moelants, J. et al. End-of-life stage of renewable growing media with biochar versus spent peat or mineral wool. Nutr Cycl Agroecosyst 128, 447-461 (2024). https://doi.org/10.1007/s10705-023-10315-8.

*Primary Examiner* — Wayne A Langel
(74) *Attorney, Agent, or Firm* — Climate Patent Collective LLC

(57) ABSTRACT

A soil composition including: a biochar proportion greater than five percent by volume; a compost proportion greater than ten percent by volume; and a bark fine proportion greater than ten percent by volume, the bark fine proportion characterized by a bark fine particle size of 3.0-10.0 millimeters.

20 Claims, 4 Drawing Sheets

(56) References Cited

FOREIGN PATENT DOCUMENTS

| | | | | |
|---|---|---|---|---|
| CN | 106699291 | A | 5/2017 | |
| CN | 114287313 | A | 4/2022 | |
| CN | 117136817 | A | 12/2023 | |
| EP | 3037397 | A1 | 6/2016 | |
| WO | WO-2011120035 | A1 * | 9/2011 | ........... A01G 31/001 |
| WO | 2013152337 | A1 | 10/2013 | |

* cited by examiner

SOIL COMPOSITION INCLUDING BIOCHAR, COMPOST, AND BARK FINES

CROSS REFERENCE TO RELATED APPLICATIONS

This Application claims priority to U.S. Provisional Application No. 63/587,985, filed on 4 Oct. 2023, and U.S. Provisional Application No. 63/575,681, filed on 6 Apr. 2024, each of which is incorporated in its entirety by this reference.

TECHNICAL FIELD

This invention relates generally to the field of horticulture and more specifically to a new and useful soil composition including biochar, compost, and bark fines in the field of horticulture.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Generally, the term "can," as utilized herein, indicates an alternative of the soil composition, which may or may not be applicable to the soil composition in various implementations of the soil composition.

Generally, the term "include," as utilized herein, can mean "comprise," "consist of," or "consist essentially of" and is not restricted to any one of the above interpretations throughout.

Generally, the term "a set of," as utilized herein, refers to one or more of the subject objects. Additionally, the terms "first," "second," "third," etc., as utilized herein, do not imply an order but simply identify multiple instances of a step or component unless an order or series is otherwise implied.

Generally, the term "proportion" as utilized herein, represents some quantity that can be expressed as either a mass or volume percentage of the soil composition.

Generally, the term "approximately," as utilized herein, indicates that a provided value may vary within some threshold, which unless otherwise specified is ±5%.

Generally, the terms "soil composition," "soil mixture," and "soil" are utilized interchangeably herein.

Generally, the term "size" when referring to non-spherical particles represents the average maximum dimension of the non-spherical particles.

Various representative statistics such as averages are utilized herein. Unless otherwise specified, these averages are replaceable with any other central tendency measure.

1. Soil Composition

Figure 1:
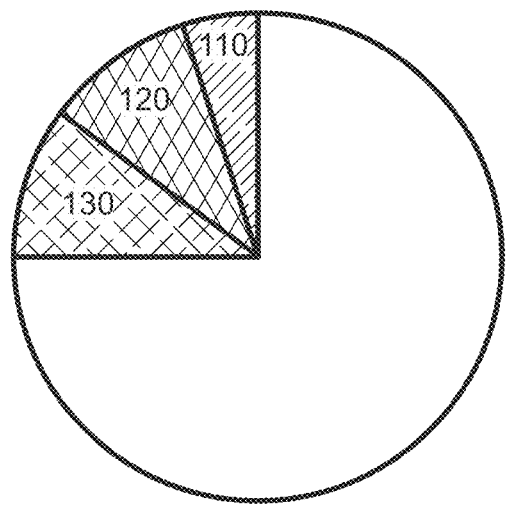
FIG. 1 is a schematic representation of one variation of the soil composition.

As shown in FIG. 1, the peat-free soil composition 100 includes: a biochar proportion 110 greater than five percent by volume; a compost proportion 120 greater than ten percent by volume; and a bark fine proportion 130 greater than ten percent by volume, the bark fine proportion 130 characterized by a bark fine particle size of 3.0-10.0 millimeters.

As shown in FIG. 1, in one variation, the peat-free soil composition 100 includes: a peat-less soil composition 100 comprising: a biochar proportion 110 greater than five percent by volume, the biochar proportion 110 characterized by a hardwood feedstock and an average biochar particle size between 0.5 and 2.0 millimeters; a compost proportion 120 greater than ten percent by volume, the compost proportion 120 characterized by a green waste or wood waste feedstock; and a bark fine proportion 130 greater than ten percent by volume, the bark fine proportion 130 characterized by an average bark fine particle size of 3.0-10.0 millimeters, and a lignin content greater than 22 percent by mass.

As shown in FIG. 1, in another variation, the peat-less soil composition 100 is characterized by a soil composition pH less than 7.3 and includes a biochar proportion 110, a compost proportion 120, and a bark fine proportion 130. This variation of the peat-less soil composition 100 includes a biochar proportion 110 greater than five percent by volume, derived from a hardwood feedstock, and characterized by an average biochar particle size between 0.5 and 7.0 millimeters. This variation of the peat-less soil composition 100 includes a compost proportion 120 greater than ten percent by volume and characterized by compost pH less than 7.5. This variation of the peat-less soil composition 100 includes a bark fine proportion 130 greater than ten percent by volume and characterized by an average bark fine particle size of 3.0-10.0 millimeters.

Figure 2:
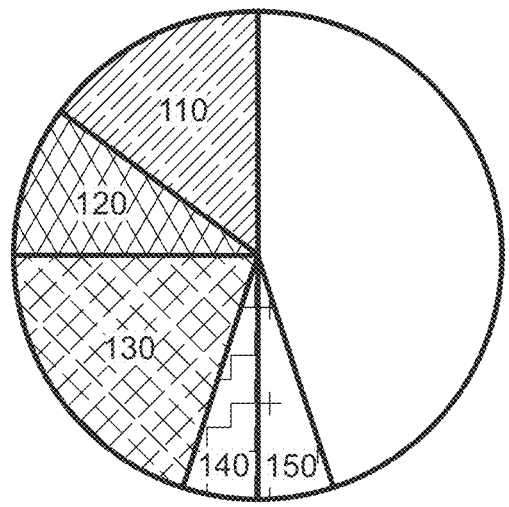
FIG. 2 is a schematic representation of one variation of the soil composition.

As shown in FIG. 2, in yet another variation, the soil composition 100 is characterized by a soil composition pH of less than 7.3 and includes a biochar proportion 110, a compost proportion 120, a bark fine proportion 130, a worm castings (or vermicompost) proportion 140, and a sand proportion. This variation of the soil composition 100 includes a biochar proportion 110 greater than fifteen percent by volume, derived from a hardwood feedstock, and characterized by an average biochar particle size between 0.5 and 7.0 millimeters. This variation of the soil composition 100 includes a compost proportion 120 greater than ten percent by volume and characterized by compost pH less than 7.5. This variation of the soil composition 100 includes a bark fine proportion 130 greater than twenty percent by volume and characterized by an average bark fine particle size of 3.0-10.0 millimeters and a lignin content greater than 22 percent by mass. This variation of the soil composition 100 includes a worm castings proportion 140 greater than five percent by volume and a sand proportion 150 greater than five percent by volume.

Figure 3:
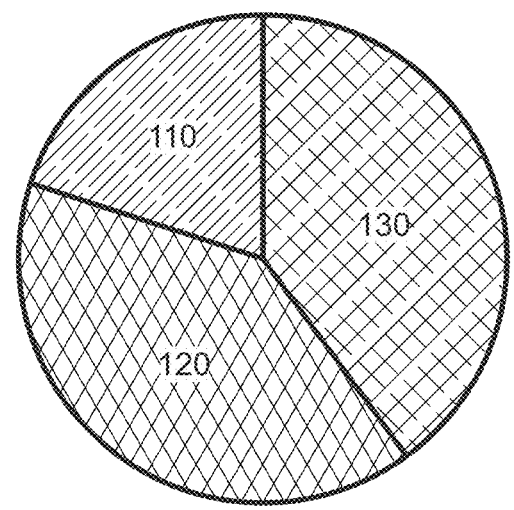
FIG. 3 is a schematic representation of one variation of the soil composition.

As shown in FIG. 3, in yet another variation, the soil composition 100 includes: a biochar proportion 110 of approximately twenty percent by volume, a compost proportion 120 of approximately forty percent by volume, and a bark fine proportion 130 of approximately forty percent by volume.

Figure 4:
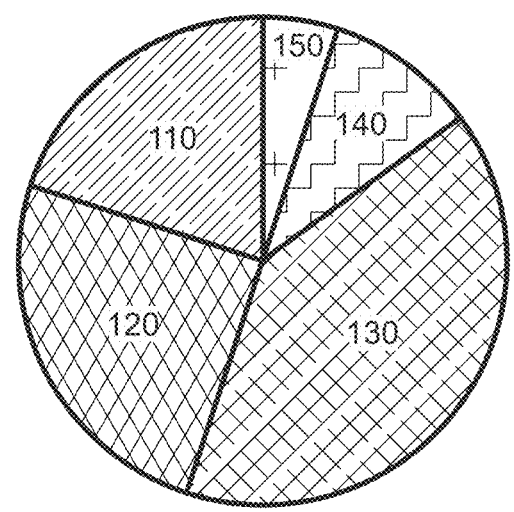
FIG. 4 is a schematic representation of one variation of the soil composition.

As shown in FIG. 4, in yet another variation, the soil composition 100 includes a biochar proportion 110 of approximately twenty percent by volume, a compost proportion 120 of approximately twenty-five percent by volume, a bark fine proportion 130 of approximately forty percent by volume, a worm castings proportion 140 of approximately five percent by volume, and a sand proportion 150 of approximately ten percent by volume.

Figure 5:
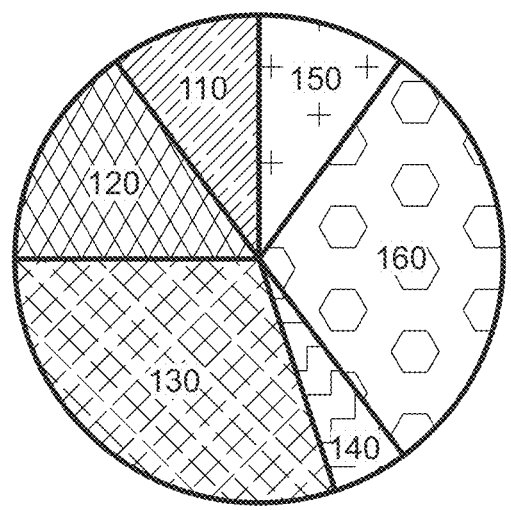
FIG. 5 is a schematic representation of one variation of the soil composition.

As shown in FIG. 5, in yet another variation, the soil composition 100 includes: a biochar proportion 110 of approximately ten percent by volume, a compost proportion 120 of approximately fifteen percent by volume, a bark fine proportion 130 of approximately thirty percent by volume, a worm castings proportion 140 of approximately five percent by volume, a pumice proportion 160 of approximately thirty percent by volume, and a sand proportion 150 of approximately ten percent by volume.

Figure 6:
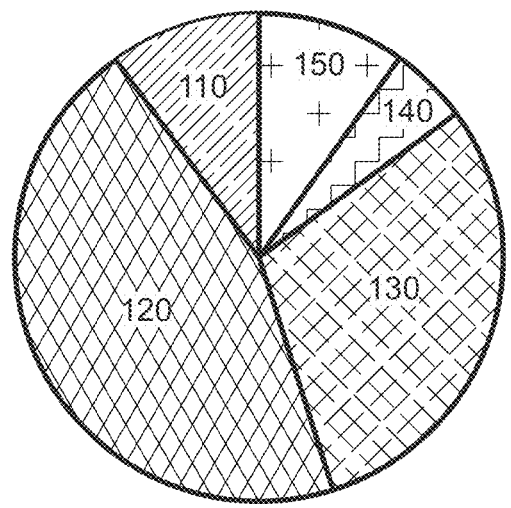
FIG. 6 is a schematic representation of one variation of the soil composition.

As shown in FIG. 6, in yet another variation, the soil composition 100 includes a biochar proportion 110 of approximately ten percent by volume, a compost proportion 120 of approximately forty-five percent by volume, a bark fine proportion 130 of approximately thirty percent by volume, a worm castings proportion 140 of approximately five percent by volume, and a sand proportion 150 of approximately ten percent by volume.

2. Applications

Generally, the peat-free soil composition 100 (hereinafter "the soil composition 100") includes a combination of biochar, compost, and bark fines as a carbon-sequestering alternative to typically carbon-intensive peat- and perlite-based soil compositions 100. More specifically, the soil composition 100 utilizes carbon-negative biochar as the foundation of the soil composition 100 instead of peat moss, which acts as a significant carbon sink in natural peatlands but releases this carbon when extracted for inclusion in a growing soil composition 100. Additionally, typical aeration amendments such as perlite require energy-intensive processing in order to function properly in a soil composition 100. Thus, the soil composition 100 includes biochar and compost as a carbon-negative alternative to peat that improves upon the favorable characteristics of peat, while the soil composition 100 includes bark fines as an environmentally friendly aeration amendment (e.g., in comparison to perlite) that delays compaction of the soil and improves water capacity.

In some applications, the soil composition 100 can sequester significant percentages of its mass in carbon dioxide. Additionally, because each of the ingredients of the soil composition 100 can be locally sourced, production of the soil composition 100 is characterized by a lower carbon footprint than other alternative soils that rely on regionally restricted feedstocks such as coconut coir. Thus, the soil composition 100 is net carbon-neutral or -negative and can contribute to climate change mitigation efforts.

In some applications, the soil composition 100 exhibits high nutrient and water availability such as greater than 250 pounds per acre of phosphorous, greater than 900 pounds per acre of potassium, greater than 600 pounds per acre of magnesium, greater than 6000 pounds per acre of calcium, greater than 14 pounds per acre of zinc, greater than 55 pounds per acre of manganese, greater than 28 pounds per acre of iron, a neutral or marginally basic pH between 6.5 and 8, and a water capacity greater than 40% by mass. Additionally, the soil composition 100 exhibits a loamy soil texture with 82% sand, 13% silt, and 5% clay. Thus, the soil composition 100 provides excellent growing conditions for a wide variety of potted and agricultural plants.

2.1 Potting Soil

In one application, the soil composition 100 is an indoor potting soil for use to grow plants within containers. In this application, the soil composition 100 can be characterized by high levels of aeration and drainage to add resiliency to overwatering. Generally, in this application, the soil composition 100 can include biochar proportion 110s upwards of twenty percent by volume, as well as a bark fine proportion 130 upwards of thirty percent by volume to improve aeration. Additionally, by including bark fines characterized by a high lignin content, the soil composition 100 resists degradation and subsequent compaction within a container. Thus, in some implementations, the soil composition 100 can function as a high-quality potting mix on par with or exceeding the performance of peat- and perlite-based alternatives.

2.2 Seedling Mix

In another application, the soil composition 100 is utilized as a seedling mix for improving seed germination. Generally, in this application, the soil composition 100 can include comparatively lower levels of biochar of approximately ten percent by volume, with higher proportions of compost, such as approximately forty-five percent by volume, to increase the nutrient content of the soil composition 100, which may improve seedling germination. Thus, in some implementations, the soil composition 100 can function as a high-quality seedling mix resulting in faster seedling germination.

2.3 Cactus Mix

In yet another application, the soil composition 100 is a cactus potting mix for supporting indoor cacti and succulents. In this application, the soil composition 100 can include comparatively low levels of biochar and compost, such as approximately ten percent by volume and fifteen percent by volume respectively, and higher levels of pumice and sand, such as upwards of thirty percent by volume and ten percent by volume respectively, to further increase the drainage rate of the soil compositions 100. Thus, in some implementations, the soil composition 100 can function as an effective cactus and succulent mix with very high drainage rates.

3. Biochar

Generally, the soil composition 100 includes at least 5% biochar by volume, which provides a sorptive media for both water and nutrients relevant to plant growth. More specifically, the soil composition 100 can include a biochar proportion 110 characterized by a particle size between 0.5 and 2.0 millimeters and a pore size between 0.2 and 50.0 micrometers, thereby ensuring sufficient surface area to increase the porosity, and therefore the absorptive properties, of the biochar. Because biochar characterized by this range of pore sizes includes both macro and micropores, the biochar enables the soil composition 100 to retain both water and nutrients for longer periods. Additionally, the pores of the biochar included in the soil composition 100 provide ideal environments for microbial growth, which is beneficial to plant health. Thus, biochar provides a functional alternative to peat as the base of the soil composition 100.

In particular, the soil composition 100 can be peat-less (i.e., it does not include peat moss or peat) and utilizes the combination of biochar and compost as a replacement, providing water retention, aeration, and organic matter (primarily from the compost). Additionally, the combination of biochar and compost can exhibit a more neutral pH (i.e., less acidic) than a peat-based soil composition 100. However, in some implementations the soil composition 100 is characterized by a pH on par with peat-based soils, such as a pH of 6.5-6.9.

In one implementation, the soil composition 100 includes biochar characterized by a hardwood feedstock to provide a greater quantity of carbon sequestered per mass of soil in addition to a higher carbon recalcitrance. In one example of this implementation, the soil composition 100 can include biochar characterized by a pine feedstock. In yet another example of this implementation, the soil composition 100 can include biochar characterized by a southern white pine feedstock. Additionally, hardwood feedstocks such as southern white pine feedstocks provide an appropriate range of pore sizes within the range of 0.2-50.0 micrometers upon pyrolysis at temperatures between 500 and 600 degrees Celsius. Furthermore, the soil composition 100 can include a hardwood feedstock from a papermill waste stream. Thus, the soil composition 100 includes biochar characterized by a hardwood feedstock to balance desirable soil properties with carbon sequestration potential.

In yet another implementation, the soil composition 100 includes biochar produced via a continuous flow pyrolysis process to heat the feedstock to a pyrolysis temperature between 500 and 600 degrees Celsius for approximately 8-12 minutes in a low oxygen environment. More specifically, the soil composition 100 can include a biochar proportion 110 derived from a pyrolysis process utilizing a pyrolysis temperature of 500-600 degrees Celsius. Additionally or alternatively, the soil composition 100 can include a biochar proportion 110 derived from a pyrolysis process utilizing a pyrolysis duration of 8-12 minutes.

In yet another implementation, the soil composition 100 includes greater than 15% biochar by volume. In this implementation, the soil composition 100 exceeds typical volume proportions of biochar in biochar-based soils, thereby increasing the amount of carbon sequestered by the soil composition 100 compared to other biochar-based soils. The soil composition 100 remains suitable for plant growth despite the high proportion of biochar due to the high proportion of compost included in the soil composition 100. In this implementation, the soil composition 100 can include greater than 40% compost by volume, thereby increasing the amount of organic matter and nutrients available in the soil composition 100 and utilizing the high biochar proportion 110 to retain these nutrients and organic matter. Additionally, the soil composition 100 can include acidic soil amendments to partially neutralize the alkaline properties of the high biochar concentration. Furthermore, as is further described below, the soil composition 100 can include the bark fines to further improve aeration and prevent soil compaction over time due to the relatively high density of biochar.

In yet another implementation, the soil composition 100 includes biochar exhibiting characteristics such as a bulk density of 5.0-10.0 pounds per cubic foot, an organic carbon percentage greater than 80% of dry mass, a volatile matter percentage less than 15% of dry mass, a pH between 10 and 11, an electrical conductivity of greater than 1.0 dS/m, and/or a surface area to mass ratio of greater than 300 square meters per dry gram.

In yet another implementation, the soil composition 100 can include pecan shell biochar proportion 110 in addition to or in replacement of the biochar proportion 110 of the soil composition 100. More specifically, the soil composition 100 can include a pecan shell biochar proportion 110 between five and thirty percent by volume. The pecan shell biochar proportion 110 functions to increase aeration and drainage of the soil composition 100 when compared to hardwood-based biochar of the same average particle diameter, by increasing heterogeneity within the soil composition 100 leading to the formation of natural air pockets. Thus, implementations of the soil composition 100 including a higher percentage of pecan shell biochar can exhibit greater resiliency to overwatering by the user of the soil composition 100.

In yet another implementation, the soil composition 100 can include an almond shell biochar proportion 110 in addition to or in replacement of the biochar proportion 110 of the soil composition 100. More specifically, the soil composition 100 can include an almond shell biochar proportion 110 between five and thirty percent by volume. Similar to the pecan shell biochar proportion 110 described above, the almond shell biochar proportion 110 functions to increase heterogeneity in the soil composition 100.

In yet another implementation, the soil composition 100 can include a rice hull proportion and/or a rice hull biochar proportion 110 in addition to or in replacement of the biochar proportion 110 of the soil composition 100. More specifically, the soil composition 100 can include a rice hull proportion between five and thirty percent by volume. Similar to the pecan shell biochar proportion 110 and the almond shell biochar proportion 110s described above, the irregular shape of rice hulls function to increase the heterogeneity and, therefore, the aeration properties of the soil composition 100.

Figure 7:
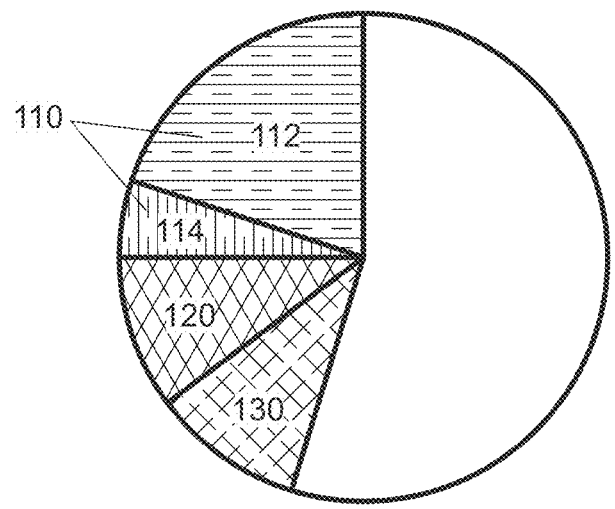
FIG. 7 is a schematic representation of one variation of the soil composition.

As shown in FIG. 7, the soil composition 100 can include a biochar proportion 110 including a hardwood biochar proportion 112 and a nut-shell biochar proportion 114. More specifically, in this implementation, the soil composition 100 can include a biochar proportion 110 greater than twenty-five percent by volume further including a hardwood biochar proportion 112 greater than twenty percent by volume and a nut-shell biochar proportion 114 greater than five percent by volume. In one example of this implementation, the soil composition 100 can include a hardwood biochar proportion 112 approximately twenty percent by volume, a nut-shell biochar proportion 114 of approximately twenty-five percent by volume, a compost proportion 120 of approximately twenty-five percent by volume, a bark fine proportion 130 of approximately twenty-five percent by volume, and a sand proportion 150 of approximately five percent by volume. In another example of this implementation, the soil composition 100 can include a hardwood biochar proportion 112 approximately twenty percent by volume, a nut-shell biochar proportion 114 of approximately fifteen percent by volume, a compost proportion 120 of approximately thirty percent by volume, a bark fine proportion 130 of approximately twenty-five percent by volume, and a sand proportion 150 of approximately ten percent by volume. In yet another example of this implementation, the soil composition 100 can include a hardwood biochar proportion 112 approximately twenty percent by volume, a nut-shell biochar proportion 114 of approximately five percent by volume, a compost proportion 120 of approximately thirty-five percent by volume, a bark fine proportion 130 of approximately thirty percent by volume, and a sand proportion 150 of approximately ten percent by volume. Thus, in this implementation, the soil composition 100 replaces aeration and drainage amendments (in the form of the bark fine proportion 130 and the sand proportion 150 respectively) with multiple forms of biochar, thereby increasing the quantity of carbon sequestered by the soil composition 100.

4. Compost

Generally, the soil composition 100 includes a compost proportion 120 greater than ten percent by volume, but can include higher compost percentages of greater than thirty percent by volume. More specifically, the soil composition 100 includes compost, which introduces organic matter into the soil composition 100, increases humus content and nutrient concentration, improves soil structure and consistency, increases water retention, and inoculates the soil composition 100 with microbes, thereby improving plant growth rates and health.

In one implementation, the soil composition 100 includes finished compost derived from green waste and wood waste (e.g., plant-based landscaping waste) feedstock. In particular, the soil composition 100 can include compost derived from green waste exhibiting greater than 0.7% total nitrogen, greater than 0.4% potassium, greater than 0.1% sulfur, greater than 3.0% calcium, greater than 0.10% magnesium, greater than 0.05% sodium, greater than 50 parts-per-million zinc, greater than 2000 parts-per-million iron, greater than 65 parts-per-million manganese, greater than 15 parts-per-million copper, and greater than 12 parts-per-million boron. Thus, the inclusion of compost improves the nutrient profile of the soil composition 100.

In another implementation, the soil composition 100 includes a lower percentage of compost within the range of twenty to thirty percent by volume for implementations in which greater soil aeration and/or carbon sequestration is desired.

In yet another implementation, the soil composition 100 includes a compost proportion 120 characterized by a compost pH less than 7.5. In this implementation, the soil composition 100 includes a lower pH compost to reduce the overall alkalinity of the biochar based soil without requiring a large amount of acidifying soil amendments, which may be difficult to balance with other desirable properties of the soil composition 100.

5. Bark Fines

Generally, the soil composition 100 can include a bark fine (i.e., tree bark ground into finer particles) proportion greater than 10% by volume. More specifically, the soil composition 100 can include bark fines to increase the aeration of the soil composition 100 and prevent compaction over time via the high lignin content of bark fines (e.g., greater than 22% by mass). Thus, the soil composition 100 leverages the high lignin content and small, heterogeneous particle size of bark fines to engender the soil composition 100 with lasting structure and improved aeration in the presence of a high biochar content and without the use of perlite or other non-renewable soil amendments.

In one implementation, the soil composition 100 can include pine bark fines, which are characterized by an especially high lignin content (28-32% by mass). Additionally or alternatively, the soil composition 100 can include other bark fines such as spruce (28-34% by mass), or fir (22-29% by mass) depending on the availability of bark fine feedstocks. Thus, the soil composition 100 incorporates locally available bark fines with a lignan content greater than 22% by mass in order to ensure durable aeration properties in the soil composition 100 without requiring transportation of bark feedstocks for long distances.

In another implementation, the soil composition 100 can include a bark fine proportion 130 including aged redwood bark fines, which are characterized by a comparatively lower pH than other bark fines. In particular, inclusion of aged redwood bark fines can reduce the pH of the soil composition 100 by 0.1 to 0.3 depending on the percentage of bark fines in the soil composition 100. Thus, implementations of the soil composition 100 including aged redwood bark fines can exhibit a more neutral pH as the slightly acidic characteristics of the aged redwood bark fines may act to neutralize the basic characteristics of the biochar proportion 110 of the soil composition 100.

In yet another implementation, the soil composition 100 includes bark fines characterized by an average particle diameter between 3.0 and 10.0 millimeters or between 0.125 to 0.375 inches. The soil composition 100 includes bark fines within this range to maintain the improved aeration provided by the bark fines without introducing impediments to plant root development within the soil composition 100 due to heterogenous soil consistency. Thus, the soil composition 100 includes bark fines characterized by a particle size significantly smaller than typical mulch or other bark-containing soil compositions 100. Furthermore, a production process for creating the soil composition 100 can include a step of milling or double screening the bark fine proportion 130 such that the bark fine proportion 130 is characterized by an average particle size between 0.125 and 0.375 inches.

In yet another implementation, the soil composition 100 can include a bark fine proportion 130 greater than 30% by volume. In this implementation, the soil composition 100 includes a higher concentration of bark fines to further decrease density and aerate the soil composition 100. In an example of this implementation, the soil composition 100 includes a bark fine proportion 130 greater than 40% by volume. Thus, the soil composition 100 can include bark fines as a large percentage of its bulk volume.

6. Worm Castings

Generally, the soil composition 100 can include a worm castings (i.e., vermicast, vermicompost) proportion greater than 5% by volume. More specifically, the soil composition 100 can include worm castings as a natural fertilizer to increase the nutrient availability within the soil composition 100. In particular, the soil composition 100 can include worm castings to increase the concentration of micronutrients such as nitrogen, phosphorus, potassium, calcium, magnesium, and sulfur. Additionally, the soil composition 100 can include worm castings as a pH buffer in implementations of the soil composition 100 characterized by an otherwise basic pH. Thus, the soil composition 100 can include a larger variety of natural nutrient sources to further improve the nutrient delivery to plants growing within the soil composition 100.

7. Sand

Generally, the soil composition 100 can include can include a sand proportion 150 configured to balance the water retention process of the soil composition 100. More specifically, the soil composition 100 can include a sand proportion 150 of greater than 5% and less than 15%. Additionally, the soil composition 100 can benefit from the increased silica content provided by the sand proportion 150. Thus, the soil composition 100 can include sand to increase water drainage and prevent overwatering by users of the soil composition 100 while increasing the silica content of the soil composition 100.

In one implementation, the soil composition 100 can include river sand or sharp sand as the primary component of the sand proportion 150. River sand is characterized by significantly lower salt content and reduced clumping tendencies when compared to ocean sand and is, generally, more appropriate for use within the soil composition 100.

8. Variation for Cactus and Succulent

In one variation, the soil composition 100 includes different proportions of bark fines, compost, and biochar and the addition of pumice to increase soil drainage when compared to variations of the soil composition 100 described above. More specifically, the cactus and succulent variation of the soil composition 100 can include a pine bark fine proportion 130 of greater than 20%, a pumice proportion 160 of greater than 20%, a biochar proportion 110 of greater than 5%, a sand proportion 150 of greater than 5%, and a compost proportion 120 of greater than 15%. In one implementation of the cactus and succulent variation, the soil composition 100 includes a pine bark fine proportion 130 of 30%, a pumice proportion 160 of 30%, a compost proportion 120 of 20%, a biochar proportion 110 of 10%, and a sand proportion 150 of 10%. Thus, the cactus and succulent variation of the soil composition 100 is characterized by significantly reduced water retention while maintaining much the reduced carbon footprint and desirable nutrient profile of aforementioned variations of the soil composition 100.

In one implementation, the cactus and succulent variation includes a pumice proportion 160 characterized by an average particle diameter between 1.0 millimeters (approximately one sixteenth of an inch) and 7.0 millimeters (approximately one quarter of an inch). More specifically, the cactus and succulent variation can include a pumice proportion 160 characterized by an average particle diameter of 3.1 millimeters. In particular, at approximately one eighth of an inch, the pumice proportion 160 can effectively decrease the water retention of the soil composition 100 without an undue increase in heterogeneity accompanied by larger particle diameters.

9. Pyrite

In one implementation, the soil composition 100 can include pyrite as an acidifying soil amendment to neutralize the alkalinity of the soil composition 100 in implementations including especially high concentrations of biochar, such as a biochar proportion 110 greater than fifteen, twenty, or thirty percent by volume. More specifically, the soil composition 100 can include a pyrite proportion of between 0.1 and 0.5 percent. In particular, the inclusion of pyrite as an acidifying soil amendment is advantageous relative to other acidifying soil amendments because pyrite releases protons into the soil composition 100 upon oxidation via exposure to water in ambient air. Thus, by delaying the release of acid until water is introduced to the soil composition 100, the pyrite proportion enables the soil composition 100 to neutralize alkalinity introduced to the soil composition 100 via tap water, while maintaining the initial pH of the soil prior to the introduction of tap water. Additionally, pyrite is a more environmentally acidic soil amendment relative to elemental sulfur, which is often available as a byproduct of petroleum production.

10. Additional Soil Amendments

Generally, the soil composition 100 can include additional soil amendments to adjust the pH of the soil composition 100 or adapt the soil composition 100 to different types of plants. In one implementation, the soil composition 100 can include a mycorrhizae amendment or a bacterial amendment to inoculate the soil composition 100 with beneficial fungi or bacteria respectively, or to adjust the bacterial-fungal ratio of the soil composition 100. Additionally or alternatively, the soil composition 100 can include an acidifying soil amendment, such as sulfur, ericaceous compost, a mulch of pine needles, cottonseed meal, kelp meal, or any other organic acidic additive, to neutralize the basic biochar. However, in some implementations, the soil composition 100 can be characterized by a neutral pH without amendments if the compost proportion 120 is sufficiently acidic (e.g., a pH less than 6.6).

As a person skilled in the art will recognize from the previous detailed description and from the figures and claims, modifications and changes can be made to the embodiments of the invention without departing from the scope of this invention as defined in the following claims.

We claim:
1. A peat-less potting soil composition comprising:
   a biochar proportion greater than five percent by volume;
   a compost proportion greater than ten percent by volume; and
   an aeration amendment comprising a bark fine proportion greater than ten percent by volume, the bark fine proportion characterized by a bark fine particle size of 3.0-10.0 millimeters.
2. The peat-less potting soil composition of claim 1, wherein the biochar proportion is characterized by an average biochar particle size of 0.5-2.0 millimeters.
3. The peat-less potting soil composition of claim 1, wherein the biochar proportion is characterized by a pore size of 0.2-50.0 micrometers.
4. The peat-less potting soil composition of claim 1, wherein the biochar proportion is characterized by a hardwood feedstock.
5. The peat-less potting soil composition of claim 1, wherein the biochar proportion is characterized by a pine feedstock.
6. The peat-less potting soil composition of claim 1, wherein the compost proportion is characterized by an organic matter concentration greater than five percent.
7. The peat-less potting soil composition of claim 1, wherein the bark fine proportion comprises a pine bark fine proportion.

8. The peat-less potting soil composition of claim 1, wherein the bark fine proportion comprises a fir bark fine proportion.

9. The peat-less potting soil composition of claim 1, wherein the bark fine proportion comprises an aged redwood bark fine proportion.

10. The peat-less potting soil composition of claim 1, further comprising a pumice proportion greater than twenty percent by volume.

11. The peat-less potting soil composition of claim 1, further comprising a worm castings proportion greater than five percent by volume.

12. The peat-less potting soil composition of claim 1, further comprising a sand proportion greater than five percent by volume.

13. The peat-less potting soil composition of claim 1, further comprising a pyrite proportion between 0.1 and 0.5 percent by mass.

14. The peat-less soil composition of claim 1, wherein the biochar proportion is derived from a pyrolysis process utilizing a pyrolysis temperature of 500-600 degrees Celsius.

15. The peat-less soil composition of claim 1, wherein the biochar proportion is derived from a pyrolysis process utilizing a pyrolysis duration of 8-12 minutes.

16. The peat-less potting soil composition of claim 1, further comprising a pumice proportion characterized by an average pumice particle diameter of 1.0-7.0 millimeters.

17. The peat-less potting soil composition of claim 1, further comprising a pumice proportion characterized by an average pumice particle diameter of approximately 3.1 millimeters.

18. The peat-less potting soil composition of claim 1:
characterized by a soil composition pH less than 7.3; and
wherein the compost proportion is characterized by compost pH less than 7.5.

19. A peat-less potting soil composition comprising:
a hardwood biochar proportion greater than twenty percent by volume;
an aeration amendment comprising a nut-shell biochar proportion greater than five percent by volume;
a compost proportion greater than ten percent by volume; and
a bark fine proportion greater than ten percent by volume, the bark fine proportion characterized by a bark fine particle size of 3.0-10.0 millimeters.

20. A potting soil composition comprising:
a biochar proportion greater than five percent by volume;
a compost proportion greater than ten percent by volume; and
an aeration amendment comprising a bark fine proportion greater than ten percent by volume, the bark fine proportion characterized by a bark fine particle size of 3.0-10.0 millimeters.

* * * * *